(12) United States Patent
Mager et al.

(10) Patent No.: US 6,271,292 B1
(45) Date of Patent: Aug. 7, 2001

(54) ORGANIC-INORGANIC HYBRID MATERIALS

(75) Inventors: Michael Mager; Harald Kraus, both of Leverkusen; Lothar Puppe, Burscheid, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/367,779
(22) PCT Filed: Feb. 12, 1998
(86) PCT No.: PCT/EP98/00775
  § 371 Date: Aug. 18, 1999
  § 102(e) Date: Aug. 18, 1999
(87) PCT Pub. No.: WO98/38251
  PCT Pub. Date: Sep. 3, 1998

(30) Foreign Application Priority Data

Feb. 25, 1997 (DE) .............................................. 197 07 390

(51) Int. Cl.⁷ ...................................................... C08K 3/00
(52) U.S. Cl. .......................... 524/261; 524/430; 524/431; 524/432; 524/433; 524/492; 524/493
(58) Field of Search ...................................... 524/261, 430, 524/431, 432, 433, 492, 493

(56) References Cited

U.S. PATENT DOCUMENTS

| 5,035,745 | 7/1991 | Lin et al. | 106/287.16 |
| 5,252,654 | 10/1993 | David et al. | 524/414 |
| 5,344,712 | 9/1994 | Basil et al. | 428/412 |
| 5,346,939 | 9/1994 | Moren et al. | 524/176 |
| 5,677,410 | 10/1997 | Mager et al. | 528/15 |

OTHER PUBLICATIONS

ACS Symposium Series #585 (month unavailable) 1995, p. 125–141.
Advanced Materials (month unavailable) 1994, p. 372–374.
Poly. Mater. Sci. Eng. 74 (month unavailable) 1996, p. 65–66.

*Primary Examiner*—Edward J. Cain
(74) *Attorney, Agent, or Firm*—Joseph C. Gil; Thomas W. Roy

(57) ABSTRACT

The present invention relates to mixtures containing organic polymers, inorganic particles and inorganic-organic binders to organic-inorganic hybrid materials which can be produced from these mixtures and to the use of these hybrid materials.

19 Claims, No Drawings

ORGANIC-INORGANIC HYBRID MATERIALS

BACKGROUND OF THE INVENTION

The present invention relates to mixtures for the production of organic-inorganic hybrid materials and to the use thereof.

By synthesising organic-inorganic hybrid materials, attempts are made to combine properties which are typical of inorganic and organic substances in one material. Thus, as is known, glass and ceramics are characterised by their hardness and brittleness, whereas organic polymers are flexible but at the same time are also considerably softer than the aforementioned substances. Meanwhile, very many organic-inorganic hybrid materials have become known which are considerably harder than organic polymers are but which nevertheless do not exhibit the brittleness of purely inorganic materials.

Hybrid materials are classified into different types depending on the type of interaction between the inorganic and the organic component. A review on this topic is given in J. Mater. Chem. 6 (1996) 511.

One class of hybrid materials is obtained by the reaction of a homogeneous mixture of an organic polymer with metal alkoxides, e.g. $Si(OEt)_4$ or $CH_3$-$Si(OEt)_3$, with water. After hydrolysis and condensation of the alkoxides, an inorganic network is obtained which is penetrated by the organic polymer ("interpenetrating network"). There is no covalent chemical bonding of the polymer to the inorganic phase. Examples of hybrid materials such as these are given in U.S. Pat. No. 5,346,939 and WO 93/01226.

According to Poly. Mater. Sci. Eng. 74 (1996) 65, the compatibility of the inorganic phase with strongly polar polymers such as polyamides, polyimides, polyamide-imides or polycarbonates is particularly good. With polymers which are less polar, however, e.g. polyvinyl chlorides or polymethyl methacrylates, which are extraordinarily important in industry, phase separation often occurs, i.e. heterogeneous, turbid materials are formed. The addition of polyoxazolines has been proposed in order to improve the compatibility in systems such as these.

Another class of materials is produced similarly, but contains reactive groups, e.g. $Si(OEt)_3$ groups, in the organic polymer which is used, which reactive groups effect covalent chemical bonding to the inorganic network. Examples thereof are given in ACS Symp. Ser. 585 (1995)125, Adv. Mater. 6 (1994) 372 and in Mater. Lett. 13 (1992) 261.

"Polymeric composites" which consist of an organic polymer and of an inorganic, glassy polymer are described in WO 93/01226. It is stated to be a characteristic of these materials that the organic polymer cannot be extracted and that no glass transition point or melting point is observed.

Mixtures consisting of unreactive, thermoplastic polymers with liquid organometallic compounds are known from U.S. Pat. No. 5,346,939. In the presence of water, composite materials are obtained therefrom in which there is no mixing at a molecular level, but in which the organic and inorganic phases are separate. Composite materials such as these are turbid, and are therefore unsuitable for applications for which highly transparent materials are required, for example covering lacquers.

SUMMARY OF THE INVENTION

The present invention therefore relates to mixtures consisting of:

A) at least one organic polymer,

B) inorganic particles,

C) at least one inorganic-organic binder,

D) solvent.

DETAILED DESCRIPTION OF THE INVENTION

Organic polymers A) in the sense of the invention may be polymers which are reactive or unreactive towards constituents B) and C).

Unreactive organic polymers do not form stable covalent bonds with the inorganic particles or with the inorganic-organic binder. The formation of Si—O—C bonds by the reaction of OH groups of the polymer with alkoxy groups, for example those of the organic-inorganic binder, is not seen in the sense of the present invention as the formation of a stable covalent bond, since a Si—O—C bond can be cleaved again with water under mild conditions. The "bonding" of the organic polymer to the inorganic components B) and C) in the latter case is essentially due to weak interactions. e.g. hydrogen bonds.

Reactive organic polymers in the sense of the invention contain groups which form stable covalent bonds, essentially Si—O—Si bonds or Si—O—Al bonds also, with the inorganic constituents B) and C). Organic polymers comprising corresponding reactive groups can be produced by (co-)polymerisation, as described in ACS Symp. Ser. 585 (1995) 125, Adv. Mater. 6 (1994) 372 and Mater. Lett. 13 (1992) 261, or by the functionalisation of an unreactive polymer. Substances which are suitable for this purpose exhibit a high level of reactivity towards the organic polymer and at the same time can also readily be bonded to the inorganic matrix. Examples include bifunctional organosilanes, which are already widely used as "coupling agents", e.g. for the embedding of glass fibres in polymers. In particular, the following organosilanes can be cited as examples, wherein R=alkyl or aryl, preferably methyl or ethyl:

a) $H_2N$—$(CH_2)_3Si(OR)_3$ b) $H_2N$—$(CH_2)_2$—$HN$—$(CH_2)_3Si(OR)_3$ c) $H_2N$—$(CH_2)_2$—$HN$—$(CH_2)_3Si(OR)_2(CH_3)$ d) $C_6H_5$—$HN$—$(CH_2)_3Si(OR)_3$ e) $H_2N$—$(CH_2)_2$—$HN$—$(CH_2)_2$—$HN$—$(CH_2)_3Si(OR)_3$ f) $OCN$—$(CH_2)_3Si(OR)_3$ g) $HS$—$(CH_2)_3Si(OR)_3$ h) $H_2COCH$—$CH_2$—$O13$ $(CH_2)_3Si(OR)_3$ i) $H_2C$=$C(CH_3)$—$COO$—$(CH_2)_3Si(OR)_3$ j) $H_2C$=$CH$—$Si(OR)_3$.

The aforementioned bifunctional organosilanes can be reacted with organic polymers in a manner which is schematically represented as follows:

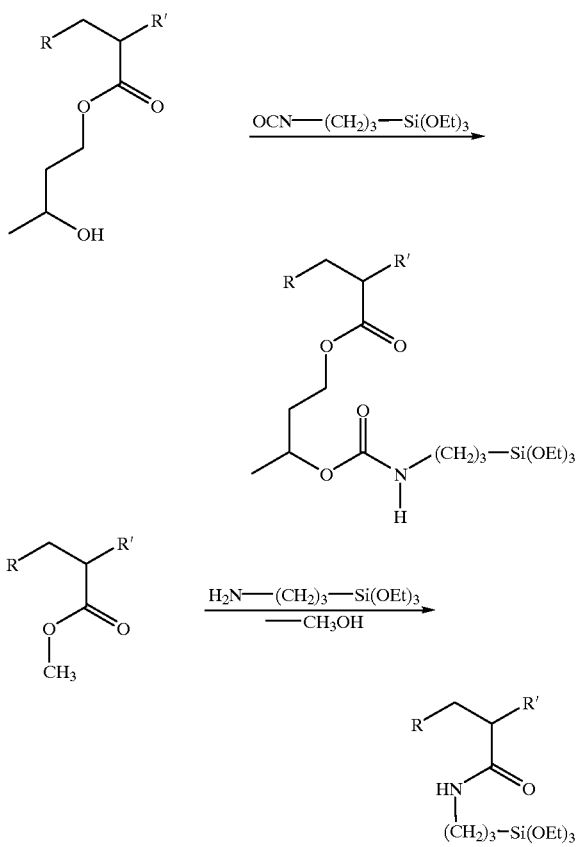

R and R' = Radicals of an arbitrary polymer chain.

It is also possible however, firstly to react the inorganic components B) and/or C), optionally with the bifunctional organosilanes, essentially with the formation of Si—O—Si bonds, and to effect reaction with the organic polymer thereafter.

Examples of organic polymers A) include polyimides, polycarbonates, polyesters, polyamides, polyketones, polyethers, polystyrenes, polyacrylonitriles, polyacrylamides, polymethacrylate esters, polyacrylate esters, polyvinyl esters, polyvinyl ethers and polyolefines, as well as copolymers and mixtures thereof ("blends").

Commercially available polyol polymers are preferably used, e.g. those based on polyesters, polyacrylic esters or polymethacrylic esters, and polymers which contain isocyanates. Examples thereof include polyols based on polyacrylates or linear and branched polyesters or polyesters/polyethers.

If a plurality of organic polymers A) is used, these can also be reacted with each other, for example by the addition of polyol polymers to polymers which contain isocyanate groups.

Inorganic particles B) in the sense of the invention are oxides or hydrated oxides of metals, semimetals or non-metals which have a primary particle diameter of 1 to 100 nm, preferably 5 to 50 nm. This is a range within which the scattering of visible light (about 400 to 700 nm) is negligibly low, and highly transparent materials can thus be obtained. Examples of inorganic particles according to the invention include silica sols ($SiO_2$), boehmite sols (Al(O)OH) and/or $TiO_2$ sols. Silica sols in organic solvents are preferred, since they can readily be mixed with other solvents, e.g. those which contain organic polymer A). However, in order to increase the solids content of the mixture according to the invention it is also possible to disperse inorganic particles B) in the organic polymer without the use of additional solvent (solvents which are necessary for dissolving the organic polymer are not "additional solvents" in the sense of the invention). Dispersions of $SiO_2$ particles in polar organic polymers, e.g. in polymers which contain OH groups, are preferably used. Dispersions in polyols, which are usually reacted with organic polymers which contain isocyanates, are most preferably used.

Organic-inorganic binders C) in the sense of the invention are polyfunctional organosilanes which contain at least 2, preferably at least 3 silicon atoms which each comprise 1 to 3 alkoxy or hydroxy groups, wherein the silicon atoms are each bonded by at least one Si—C bond to a structural unit which links the silicon atoms.

Examples of linking structural units in the sense of the invention include linear or branched $C_1$ to $C_{10}$ alkylene chains, $C_5$ to $C_{10}$ cycloalkylene radicals, aromatic radicals e.g. phenyl, naphthyl or biphenyl, and combinations of aromatic and aliphatic radicals also. The aliphatic and aromatic radicals may also contain hetero atoms such as Si, N, O, S or F.

Examples of polyfunctional organosilanes include compounds of general formula (I)

wherein
  i=2 to 4, preferably i=4,
  n=10, preferably n=2 to 4, most preferably n=2, and
  $R^6$=alkyl or aryl,
  $R^8$=alkyl or aryl, preferably $R^8$=methyl,
  a=1 to 3,
  $R^7$=alkyl or aryl, preferably $R^7$=methyl, ethyl or isopropyl;
  if a=1, $R^7$ may also denote hydrogen.

Other examples include cyclic compounds of general formula (II)

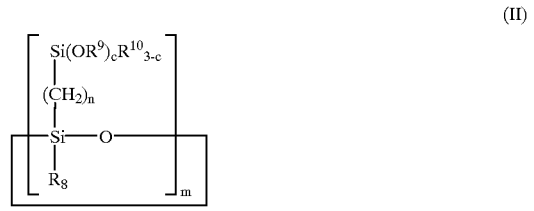

wherein
  m=3 to 6, preferably m=3 or 4,
  n=2 to 10, preferably n=2.
  $R^8$=a $C_1$–$C_6$ alkyl or $C_6$–$C_{14}$ aryl,
  preferably $R^8$=methyl or ethyl, most preferably $R^8$=methyl,
  $R^{10}$=an alkyl or aryl, preferably $R^{10}$=methyl,
  c=1 to 3,
  $R^9$=an alkyl or aryl, preferably $R^9$=methyl, ethyl or isopropyl;
  if c=1, $R^9$ may also denote hydrogen.

Other examples of polyfunctional organosilanes include compounds of general formula (III)

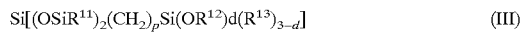

wherein
p=1 to 10, preferably p=2 to 4, most preferably p=2,
$R^{11}$=an alkyl or aryl, preferably $R^{11}$=methyl,
$R^{13}$=an alkyl or aryl, preferably $R^{13}$=methyl,
d=1 to 3,
$R^{12}$=an alkyl or aryl, preferably $R^{12}$=methyl, ethyl or isopropyl;
if d=1, $R^{12}$ may also be hydrogen.

Other examples of polyfunctional organosilanes include silanols or alkoxides, e.g.
a) $Si[(CH_2)_2Si(OH)(CH_3)_2]_4$
b) cyclo-$\{OSiMe[(CH_2)_2Si(OH)Me_2]\}_4$, or
c) cyclo-$\{OSiMe[(CH_2)_2Si(OEt)_2Me]\}_4$,
d) cyclo-$\{OSiMe[(CH_2)_2Si(OMe)Me_2]\}_4$,
e) cyclo-$\{OSiMe[(CH_2)_2Si(OEt)_3]\}_4$.

The mixtures according to the invention may additionally contain alkoxides of metals and nonmetals, e.g. in order to increase their wear-resistance. Examples thereof include alkoxides of general formula (IV)

$$R^3_{x-y}M(OR^2)_y \qquad (IV)$$

wherein
M=Si, Sn, Ti, Zr (x=4, y=1 to 4), or
M=B, Al (x=3, y=1 to 3),
$R^2$, $R^3$=alkyl, aryl,
preferably $R^2$, $R^3$=methyl, ethyl, isopropyl, n-butyl, sec-butyl, tert-butyl, phenyl, most preferably $R^2$, $R^3$=methyl and ethyl.

Examples include $Si(OEt)_4$, $Si(OMe)_4$, $H_3C$—$Si(OEt)_3$, $C_6H_5$—$Si(OEt)_3$, $B(OEt)_3$, $Al(O^iPr)_3$ or $Zr(O^iPr)_4$. $Si(OEt)_4$ is preferably used. Instead of monomeric alkoxides, condensation products thereof can also be used. Examples which are commercially available include $Si(OEt)_4$ condensates.

In addition, the mixtures according to the invention may also contain catalysts for speeding up the reactions of hydrolysis and condensation, or pigments for imparting coloration or for protection from corrosion.

Examples of suitable solvents D) include alcohols such as methanol, ethanol, isopropanol. 1-butanol 2-butanol, 1,2-ethanediol and glycerol, ketones such as acetone, methyl ethyl ketone, methyl isobutyl ketone and butanone, esters such as ethyl acetate or butyl acetate, aromatic compounds such as toluene or xylene, ethers such as tert.-butyl methyl ether, and aliphatic hydrocarbons.

Organic and inorganic acids or bases, as well as organo-metallic compounds or metal alkoxides, can be used as catalysts.

In order to produce the mixtures according to the invention, the components are mixed in any sequence. The organic polymers are preferably used in a solvent.

For the production of mixtures which result in materials in which the organic polymer and the inorganic component are not covalently bonded, the following embodiment is preferred: the organic polymer A) is placed in a vessel in a solvent D), the inorganic particles B), preferably as a transparent dispersion in a solvent, and the organic-inorganic binder C) are added with stirring, optionally followed by alkoxides, other solvents, water catalysts and/or pigments.

For mixtures from which materials are to be produced in which the organic polymer and the inorganic component are covalently bonded so that they are stable towards hydrolysis, in one preferred embodiment the organic polymer A) is first reacted with a bifunctional organosilane. After this reaction is complete, the inorganic particles B), preferably as a transparent dispersion in a solvent, and the organic-inorganic binder C) are added, and finally other solvents, water, catalysts and/or pigments are added.

In a further embodiment, bifunctional organosilanes can also first be reacted with the inorganic particles B) and/or the organic-inorganic binder C). Thereafter, the organic polymer A) is added, and alkoxides, other solvents, water, catalysts and/or pigments are optionally added.

In the embodiments cited above, the inorganic particles B) can also be used as dispersions in the organic polymer A), optionally in the presence of solvents.

The mixtures according to the invention are ready to use immediately after mixing the starting components, an can be used for coatings, for example. However, the mixtures are preferably stirred for a certain length of time. In the presence of water and condensation catalysts in particular, condensation polymers are thus formed from the organic-inorganic binder or from the metal alkoxides which are optionally added. Mixtures which are treated in this-manner cure significantly more rapidly than those which are freshly prepared.

Organic-inorganic hybrid materials can be produced by removing the volatile constituents from the mixtures according to the invention. This can be effected, for example, by evaporating the volatile constituents at temperatures from −10 to 200° C. preferably 15 to 60° C.

The organic-inorganic hybrid materials which are thus obtained consist of interpenetrating networks or of a molecular mixture of inorganic and organic components. The inorganic network is formed from the inorganic particles B), from the organic-inorganic binder C) and optionally from alkoxides and/or bifunctional organosilanes or from the corresponding hydrolysis and condensation products of all the aforementioned components. It is a characteristic of the materials that the inorganic network contains structural units in which silicon atoms are linked via organic radicals, to which they are bonded via Si—C bonds.

The new materials are suitable for the production of coatings and mouldings, for example. On account of their high content of inorganic components, mouldings produced from the materials according to the invention exhibit reduced flammability compared with mouldings produced from polyurethanes, for example.

Coatings of the materials are distinguished by their good adherence, high transparency, resistance to solvents and chemicals, resistance to wear, and flexibility. The coatings cure very well on glass and metals, and also cure well on many organic and ceramic materials. Thus, for example, primer coats of polyurethane lacquers can be overcoated without problems. Coatings which exhibit good adherence can also be applied without pre-treatment to transparent plastics such as polycarbonates, in order to improve the scratch-resistance thereof.

The organic-inorganic hybrid materials according to the invention can be used, as transparent coatings for example, for applications where high wear-resistance, flexibility and resistance to chemicals and solvents is required. Examples of suitable applications include covering lacquers in the motor vehicle sector, in the marine sector (ships, harbour installations) and in the construction of chemical apparatus (e.g. internal and external coatings for pipelines or reactors).

For use in the automobile sector, a high wear-resistance together with a resistance to solvents and chemicals is essential. In order to avoid the chipping (over a large area) of lacquer films when they are damaged by deformation, the coatings also have to exhibit a certain flexibility. Coatings can be produced from the organic-inorganic hybrid materials according to the invention which exhibit a resistance to solvents and chemicals which is just as good or sometimes even better than that of the best covering lacquers which have been tested in practice. At the same time, the materials according to the invention exhibit a significantly improved wear-resistance. The coatings according to the invention, which have a high content of inorganic components, are also particularly suitable as anti-fouling coatings for ships.

On account of their repellent effect in relation to many colorants, and due to their good resistance to solvents, the coatings according to the invention are also particularly suitable as anti-graphiti coatings. Firstly, the coatings are poorly wetted, so that a film of colorant coalesces to form droplets, and secondly a dried colorant can effortlessly be removed. The coatings can also be applied to already-existing coatings, in order to provide effective protection for vehicles or buildings.

EXAMPLES

The polyacrylates which were used as organic polymers are commercially available, under the trade name Desmophen®, from Bayer AG, D-51386 Leverkusen. Unless indicated otherwise. Desmophen® A 665 (3.0% of OH groups) was used as a 65% solution in n-butyl acetate/xylene (3:1), and Desmophen® A 450 (1.0% of OH groups) was used as a 50% solution in n-butyl acetate.

As described in Examples 1 and 2, respectively, cyclo-$\{OSiMe[(CH_2)_2Si(OH)Me_2]\}_4$ ("D4 silanol") and cyclo-$\{OSiMe[(CH_2)_2Si(OEt)_2Me])\}_4$ ("D4 diethoxide") were produced by the hydrosilylation of cyclo-$\{OSi(CH_3)(C_2H_3)\}_4$ with $HSiClMe_2$ or $HSiCl_2Me$ and subsequent hydrolysis or alcoholysis.

$Si[(CH_2)_2Si(OH)Me_2]_4$ ("TVS silanol") was correspondingly produced from tetravinylsilane. $HSiClMe_2$ and subsequent hydrolysis, as described in DE OS 19 603 242.

The hydrosilylation catalysts were commercially available catalysts, e.g. "Silopren U Pt/S catalyst" (a 68% solution in isopropanol of a Pt complex which is substituted with cyclo-$\{OSi(CH_3)(C_2H_3)\}_4$ ligands) supplied by Bayer AG, D-51368 Leverkusen, or were produced as described above.

The aforementioned compounds were synthesised in an argon atmosphere or under vacuum.

The (organo)silica sol used consisted of a dispersion of about 30% by weight $SiO_2$ (primary particle diameter about 9 nm) in isopropanol. The quoted $SiO_2$ content, which is given with respect to the total solids content, results from the amount of (organo)silica sol ($SiO_2$ content 30%) and TEOS ($SiO_2$ content 28.8% for complete condensation) added. Films were applied to glass by means of a film-drawing frame (doctor blade), and were cured for 1 hour at 110° C. in a recirculating air oven unless indicated otherwise.

A cross-cut adhesion test according to ISO 2409 was performed in order to test the hardness. The pencil hardness was determined according to ASTM D 3363-92a with pencils of the "Stabilo-micro 8000" brand (Schwan. Germany), with hardnesses from B to 7H. The hardness of the pencil which is quoted is that which did not scratch the film through to the substrate. The pendulum hardness was determined according to DIN 53 157. The Erichsen cupping index was determined according to DIN ISO 1520.

The resistance to solvents was tested visually (time of action: 1 minute or 5 minutes), and was assessed from "0" (unchanged) to "5" (changed considerably, e.g. blister formation, detachment or dissolution, or softening).

The washing train test was performed in a laboratory washing train consisting of a rotating brush (polyethylene bristles) and two nozzles for supplying the abrasive medium (quartz sand, average particle size 25 μm). The coated plate to be tested was moved backwards and forwards ten times under the brush and was sprayed with the water-sand mixture at the same time. After 10 cycles, the surface was cleaned with ethanol and the loss in gloss was determined (gloss measurement at 20° C.).

The efficacy as an anti-graffiti coating was tested by the action for 1 hour of a 1% solution of fuchsine in water-ethanol-butyl glycol (1:1:1). The dry film was wiped with a paper towel saturated with ethanol, and the remaining dye was classified visually into the categories "slightly pink" and "pink". When no residual fuchsine was discernible, this was denoted as "removed without residue".

Percentages are given as percentages by weight unless indicated otherwise.

Example 1

Coating of powdered activated carbon with $H_2PtCl_6$ 49.5 g of Norit CN 1 activated carbon were slurried in 300 ml of double-distilled water and were mixed with 200 ml of an aqueous $H_2PtCl_6$ solution which contained 0.5 g Pt, calculated as the metal. The batch was subsequently stirred for 10 minutes and the catalyst was filtered off by suction through a Buchner funnel. The moist, crude product (153 g) was dried at 0.1 Pa and 110° C. and was stored under argon. The catalyst contained 1% platinum.

Synthesis of cyclo-$\{OSiMe[(CH_2)_2SiClMe_2]\}_4$ 69 g (726.7 mmol) chlorodimethylsilane and 800 mg of the catalyst (produced as described above) were added to 50 g (145.2 mmol) cyclo-$\{OSi(CH_3)(C_2H_3)\}_4$ in 120 ml THF. The reaction mixture was heated to 50° C., whereupon no generation of heat was observed, even after 2 hours at this temperature. After a further 20 hours at 55 to 60° C. the batch was cooled to room temperature and the catalyst was filtered off through a glass frit. The clear, colourless filtrate was freed from volatile constituents under vacuum, and the product was obtained as a colourless oil.

Synthesis of cyclo-$\{OSiMe[(CH_2)_2Si(OH)Me_2]\}_4$ 105 g (145.2 mmol) cyclo-$\{OSiMe[(CH_2)_2SiClMe_2]\}_4$ in 100 ml diethyl ether was added drop-wise, over one hour, to a mixture consisting of 87.4 ml (63.6 g; 628.3 mmol) triethylamine. 12.1 ml (12.1 g; 672.2 mmol) water and 2850 ml tert.-butyl methyl ether. After the addition was complete, the batch was stirred for a further one hour and the precipitate of triethylammonium hydrochloride was filtered off. The volatile constituents were then removed under vacuum by means of a rotary evaporator, and the oily residue was taken up in a little THF and was filtered through silica gel. After the repeated removal of all the volatile constituents under vacuum, the product was obtained as a viscous oil.

Yield: 69.5 g, corresponding to 74% theoretical.

Example 2

Synthesis of cyclo-$\{OSiMe[(CH_2)_2SiCl_2(CH_3)]\}_4$ 249.5 g (725.5 mmol) cyclo-$\{OSi(CH_3)(C_2H_3)\}_4$ were placed in a vessel in 250 ml toluene (p.a.), and after adding 50 μl of Silopren U catalyst the batch was heated to 100° C. 30 ml dimethylchlorosilane were then rapidly added, whereupon the temperature immediately rose to 110° C. Drop-wise addition then commenced of the remaining amount of 332.3 ml (367.2 g; 3.19 mol) dimethylchlorosilane. During the drop-wise addition (about 2 hours) the temperature of the reaction mixture rose transiently to about 120° C., but fell to 107° C. when the final 30 ml were added. The yellowish reaction mixture was stirred for a further 2 hours at 110° C. and was then cooled to room temperature. After removing the volatile constituents by condensation under vacuum, a pale yellowish oil was obtained.

Yield: 581.0 g, corresponding to 99.6% theoretical.

Synthesis of cyclo-$\{OSiMe[(CH_2)_2Si(OEt)_2(CH_3)]\}_4$ 581.0 g (722.2 mmol) cyclo-$\{OSiMe[(CH_2)_2SiCl_2(CH_3)]\}_4$ (produced as described above) were dissolved in 500 ml ethanol and were added drop-wise to 476.0 g (10.33 mol) ethanol (p.a.). After the drop-wise addition (about 2 hours), during which the temperature of the reaction mixture rose to about 32° C., the batch was heated under reflux for a further 2 hours, whereupon gaseous hydrogen chloride was still evolved briskly. Finally, the volatile constituents were distilled off, firstly at normal pressure and secondly under vacuum. A slightly yellowish oil was obtained.

Example 3

D4 silanol/Desmophen® A 665 without additional solvent 15 g cyclo-$\{OSiMe[(CH_2)_2Si(OH)Me_2]\}_4$ were stirred with 108.4 g Desmophen® A 665 until a homogeneous mixture was obtained. 135.5 ml organosol, 75 ml TEOS and 12 ml 0.1 N hydrochloric acid were then added and the homogeneous mixture was stirred for a further 2 hours. Solids content: 43%.

After application and curing, a transparent, crack-free film was obtained which exhibited a slight pattern due to drying.

| Wet film thickness [μm] | Dry film thickness [μm] | Pencil hardness | Anti-graphiti test |
|---|---|---|---|
| 240 | 46 | 6 H | removed without residue |

Example 4

D4 silanol/Desmophen® A 665 with a low content of organosol 108.4 g Desmophen® A 665, 68 ml organosol, 75 ml TEOS and 12 ml 0.1 N hydrochloric acid were added to 150 g of a 10% solution of cyclo-$\{OSiMe[(CH_2)_2Si(OH)Me_2]\}_4$ in n-butanol.

After application and curing, a transparent, crack-free film was obtained.

| Wet film thickness [μm] | Dry film thickness [μm] | Pencil hardness | Anti-graphiti test |
|---|---|---|---|
| 120 | 15 | 5 H | slightly pink |

Example 5

D4 silanol/Desmophen® A 665 with a high content of organosol 150 g of a 10% solution of cyclo-$\{OSiMe[(CH_2)_2Si(OH)Me_2]\}_4$ in n-butanol, 108.4 g Desmophen® A 665, 135.5 ml organosol. 75 ml TEOS and 12 ml 0.1 N hydrochloric acid were mixed together and stirred for 2 hours. A homogeneous mixture was obtained.

Application was effected by spraying (carrier gas: nitrogen); automobile-specific tests:

| Dry film thickness [μm] | Pendulum hardness [swings] | Erichsen cupping test [mm] | Resistance to solvents*[ ) ] | Resistance to chemicals [° C.]**[ ) ] | Washing train test [%]***[ ) ] |
|---|---|---|---|---|---|
| 40 | 130 | 3.0–4.5 | 0 | 36 | 82.5 |
| | | | 0 | 36 | 60.3 |
| | | | 1 | 36 | 22.2 |
| | | | 2 | 36 | |
| | | | 0 | 45 | |

*[ ) ]xylene, MPA, ethyl acetate, acetone (time of action: 1 minute), petrol (10 minutes).
**[ ) ]tree gum, brake fluid, pancreatin (50%), NaOH (1%), sulphuric acid (1%); The temperature given corresponds to the first visible damage.
***[ ) ]Loss of gloss after 10 washes, determined at an angle of incidence of 20° (initial gloss, final gloss, difference).
By comparison: loss of gloss of a commercially available 2-component polyurethane covering lacquer: 35.2.

Example 6

D4 silanol/Desmophen® A 665 with prior reaction of the inorganic components 150 g of a 10% solution of cyclo-$\{OSiMe[(CH_2)_2Si(OH)Me_2]\}_4$ in n-butanol, 68 ml organosol. 75 ml TEOS and 12 ml 0.1 N hydrochloric acid were mixed together and stirred for 2 hours. A homogeneous mixture was obtained.

After application and curing, a transparent, crack-free film was obtained.

| Wet film thickness [μm] | Dry film thickness [μm] | Pencil hardness | Anti-graphiti test |
|---|---|---|---|
| 120 | 15 | 6 H | slightly pink |

Example 7

D4 silanol/Desmophen® A 665 (70% solution in n-butyl acetate)

1.5 g cyclo-$\{OSiMe[(CH_2)_2Si(OH)Me_2]\}_4$ were stirred with 10.08 g Desmophen® A 665 until a homogeneous mixture was obtained. 13.6 ml organosol, 7.5 ml TEOS and 1.2 ml 0.1 N hydrochloric acid were then added and the homogeneous mixture was stirred for a further 2 hours.

After application and curing, a transparent, crack-free film was obtained.

| Wet film thickness [μm] | Dry film thickness [μm] | Pencil hardness | Anti-graphiti test |
|---|---|---|---|
| 240 | 46 | 6 H | slightly pink |

Examples 8–10

D4 diethoxide/Desmophen® A 665

The starting materials were mixed together in the sequence given in the Table and the batch was stirred for 2 hours. Homogeneous mixtures were obtained.

| Component | Example 8 | Example 9 | Example 10 |
|---|---|---|---|
| D4 diethoxide [g] | 5.25 | 5.25 | 5.25 |
| TEOS [g] | 5.02 | 5.02 | 5.02 |
| ethanol [ml] | | 10.0 | |
| butanol [ml] | 10.0 | | 10.0 |
| 0.1N HCl [g] | 1.10 | 1.10 | 1.10 |
| (organo)silica sol [ml] | 10.0 | 10.0 | 15.0 |
| Desmophen ® A 665 [g] | 1.50 | 1.50 | 1.50 |
| solids content [%] | 28.8 | 29.0 | 29.0 |
| $SiO_2$ content [%] | 49.9 | 49.9 | 57.1 |

After application and curing, transparent, crack-free films were obtained.

| Example. No. | Wet film thickness [µm] | Dry film thickness [µm] | Pencil hardness | Anti-graffiti test |
|---|---|---|---|---|
| 8 | 120 | 13 | 6 H | slightly pink |
| 9 | 120 | 12 | 6 H | slightly pink |
| 10 | 120 | 14 | 6 H | slightly pink |

Examples 11 and 12

D4 diethoxide/Desmophen® A 665 with prior reaction of the inorganic components

The (inorganic) components listed in the Table were mixed together and stirred for 2 hours. The organic polymer (Desmophen® A 665) was then added and the batches were stirred until homogeneous mixtures were present.

| Component | Example 11 | Example 12 |
|---|---|---|
| D4 diethoxide [g] | 5.25 | 5.25 |
| TEOS [g] | 5.02 | 5.02 |
| ethanol [ml] | 10.0 | 10.0 |
| 0.1N HCl [g] | 1.10 | 1.10 |
| (organo)silica sol [ml] | | 10.0 |
| Desmophen ® A 665 [g] | 1.0 | 1.50 |
| solids content [%] | 27.6 | 29.0 |
| $SiO_2$ content [%] | 25.9 | 49.9 |

After application and curing, transparent, crack-free films were obtained.

| Example No. | Wet film thickness [µm] | Dry film thickness [µm] | Pencil hardness | Anti-graffiti test |
|---|---|---|---|---|
| 1 | 120 | 20 | 6 H | removed without residue |
| 12 | 120 | 12 | 6 H | slightly pink |

Examples 13 and 14

Reaction of Desmophen® A 665 (70% solution in n-butyl acetate) with $OCN-(CH_2)_3-Si(OEt)_3$ 100 g Desmophen® A 665 were stirred with 0.7 g (Example 13) or 3.5 a (Example 14) $OCN-(CH_2)_3-Si(OEt)_3$ in each case and the batch was thereafter annealed in a drying oven for 5 hours at 45° C. A colourless mixture was obtained, the viscosity of which had not changed perceptibly.

D4 silanol/Desmophen® A 665 (functionalised with $OCN-(CH_2)_3-Si(OEt)_3$)

The starting materials were mixed together with each other in the sequence given in the Table and were stirred for 2 hours. Homogeneous mixtures were obtained.

| Component | Example 13 | Example 14 |
|---|---|---|
| D4 silanol [g] | 1.50 | 1.50 |
| butanol [ml] | 13.5 | 13.5 |
| Desmophen ® A 665 [g] (modified according to a)) | 10.0 | |
| Desmophen ® A 665 [g] (modified according to b)) | | 10.0 |
| organosol [g] | 13.6 | 13.6 |
| TEOS [ml] | 7.50 | 7.50 |
| 0.1N HCl [g] | 1.20 | 1.20 |
| solids content [%] | 33.0 | 32.9 |
| $SiO_2$ content [%] | 41.8 | 42.0 |

After application and curing, transparent, crack-free films were obtained.

| Example No. | Wet film thickness [µm] | Dry film thickness [µm] | Pencil hardness | Anti-graffiti test |
|---|---|---|---|---|
| 13 | 240 | 37 | 6 H | removed without residue |
| 14 | 240 | 26 | 6 H | removed without residue |

Examples 15–17

TVS silanol/Desmophen® A 450 (50% solution in n-butyl acetate/xylene (1:1))

2.0 g $Si[(CH_2)_2Si(OH)Me_2]_4$, 4.0 ml TEOS, 5.0 ml ethanol and 1.0 ml 0.1 N hydrochloric acid were mixed together and stirred for 1 hour. Thereafter, 2 g Desmophene® A 450 (Example 15), 1.0 Desmophen® A 450 (Example 16) or 0.5 g Desmophen® A 450 (Example 17) were added to 2 ml of this solution and stirred until homogeneous mixtures were obtained.

A polycarbonate sheet and an ABS sheet were each coated (90 µm) with the solutions obtained in this manner, and the coating was cured for 1 hour at 130° C. or 90° C.

The results of cross-cut adhesion tests were as follows:

| Example No. | Polycarbonate | ABS |
|---|---|---|
| 15 | 0/0 | 0/0 |
| 16 | 0/0 | 0/0 |
| 17 | 0/3 | 4/5 |

Example 18

D4 silanol/Desmophen® A 450

1.5 g cyclo-${OSiMe[(CH_2)_2Si(OH)Me_2]}_4$, 10 g methyl ethyl ketone, 10 g Desmophen® A 450, 13.6 ml organosol, 7.5 ml TEOS and 1.2 ml of 0.1 N hydrochloric acid were mixed together and stirred for 2 hours. A homogeneous mixture was obtained.

After application and curing, a transparent, crack-free film was obtained.

| Wet film thickness [μm] | Dry film thickness [μm] | Pencil hardness | Anti-graphiti test |
|---|---|---|---|
| 120 | 16 | 7 H | removed without residue |

Comparative Examples 1a–1g

TEOS, H₃C-Si(OEt)₃ or Ph-Si(OEt)₃/Desmophen® A 665 (no organic-inorganic binder)

The starting materials were mixed together in the sequence given in the Table and stirred for 2 hours. Homogeneous mixtures were obtained.

A glass plate was coated with each of the solutions which were obtained in this manner (wet film thickness 240 μm) and the coating was cured for 15 minutes at 130° C.

| Example | 1a | 1b | 1c | 1d | 1e | 1f | 1g |
|---|---|---|---|---|---|---|---|
| Desmophen® A 665 [g] | 1.51 | 1.51 | 1.51 | 1.51 | 1.51 | 1.51 | 1.51 |
| (organo)silica sol [ml] | 2.22 | 2.20 | 1.81 | 2.11 | 1.97 | 1.80 | 2.11 |
| TEOS [g] | 0.86 | 0.53 | 0.94 | 0.98 | 0.77 | 0.95 | 0.98 |
| H₃C—Si(OEt)₃ [g] | 0.27 | 0.53 | 0.94 | — | — | — | — |
| C₆H₅—Si(OEt)₃ [g] | — | — | — | 0.21 | 0.41 | 0.41 | 0.21 |
| n-BuOH [g] | 1.63 | 1.72 | 1.63 | 1.68 | 1.82 | 1.79 | |
| 0.1N hydrochloric acid [g] | 0.19 | 0.17 | 0.24 | 0.19 | 0.18 | 0.21 | 0.19 |
| dry film thickness [μm] | 28 | 32 | 26 | 24 | 27 | 22 | 38 |
| pencil hardness | 1H | 1H | 1H | HB | HB | HB | 1H |
| Anti-graffiti test | pink | pink | pink | pink | pink | slightly pink | pink |

Comparative Examples 2a and 2b

TEOS. H₃C-Si(OEt)₃ or Ph-Si(OEt)₃/Desmophen® A 665 (no organic-inorganic binder)

The starting materials were mixed together in the sequence given in the Table and stirred for 2 hours. Homogeneous mixtures were obtained.

A glass plate was coated with each of the solutions which were obtained in this manner (wet film thickness 240 μm) and the coating was cured for 15 minutes at 130° C.

| Example | 2a | 2b |
|---|---|---|
| Desmophen ® A665 [g] | 1.51 | 1.51 |
| (organo)silica sol [ml] | 2.11 | 1.97 |
| TEOS [g] | 0.98 | 0.77 |
| C₆H₅—Si(OEt)₃ [g] | 0.21 | 0.41 |
| 2-butanone [g] | 0.84 | 0.91 |
| 0.1N hydrochloric acid [g] | 0.19 | 0.18 |
| dry film thickness [μm] | 42 | 38 |
| pencil hardness | 2 H | 2 H |
| Anti-graffiti test | pink | pink |

What is claimed is:

1. A composition comprising

A) an organic polymer,
   B) inorganic particles,
   C) an inorganic-organic binder comprising an organosilane having at least two silicon atoms each comprising 1 to 3 alkoxy or hydroxy groups, wherein the silicon atoms are each bonded by at least one Si—C bond to a structural unit which links the silicon atoms and
   D) a solvent.

2. The composition of claim 4 wherein said inorganic-organic binder comprises a compound corresponding to the formula

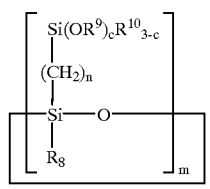

wherein
   m has a value of 3 to 6
   n has a value of 2 to 10,
   c has a value of 1 to 3,
   $R^8$ represents a $C_1$–$C_6$ alkyl or $C_6$–$C_{14}$ aryl group,
   $R^9$ represents an alkyl or aryl group, provided that if c has a value of 1, $R^9$ may represent hydrogen, and
   $R^{10}$ represents an alkyl or aryl group.

3. The composition of claim 1 wherein said organic polymer comprises a polyol polymer.

4. The composition of claim 2 wherein said organic polymer comprises a polyol polymer.

5. The composition of claim 1 wherein said organic polymer comprises a polymer containing a group which forms Si—O—Si bonds.

6. The composition of claim 2 wherein said organic polymer comprises a polymer containing a group which forms Si—O—Si bonds.

7. The composition of claim 1 wherein said inorganic particles comprise an oxide or a hydrated oxide of a metal, semimetal or non-metal having a primary particle diameter of 1 to 100 nm.

8. The composition of claim 2 wherein said inorganic particles comprise an oxide or a hydrated oxide of a metal, semimetal or non-metal having a primary particle diameter of 1 to 100 nm.

9. The composition of claim 3 wherein said inorganic particles comprise an oxide or a hydrated oxide of a metal, semimetal or non-metal having a primary particle diameter of 1 to 100 nm.

10. The composition of claim 4 wherein said inorganic particles comprise an oxide or a hydrated oxide of a metal, semimetal or non-metal having a primary particle diameter of 1 to 100 nm.

11. The composition of claim 5 wherein said inorganic particles comprise an oxide or a hydrated oxide of a metal, semimetal or non-metal having a primary particle diameter of 1 to 100 nm.

12. The composition of claim 6 wherein said inorganic particles comprise an oxide or a hydrated oxide of a metal, semimetal or non-metal having a primary particle diameter of 1 to 100 nm.

13. The composition of claim 1 wherein said inorganic particles comprise an oxide or a hydrated oxide of silica having a primary particle diameter of 1 to 100 nm.

14. The composition of claim 2 wherein said inorganic particles comprise an oxide or a hydrated oxide of silica having a primary particle diameter of 1 to 100 nm.

15. The composition of claim 3 wherein said inorganic particles comprise an oxide or a hydrated oxide of silica having a primary particle diameter of 1 to 100 nm.

16. The composition of claim 4 wherein said inorganic particles comprise an oxide or a hydrated oxide of silica having a primary particle diameter of 1 to 100 nm.

17. The composition of claim 5 wherein said inorganic particles comprise an oxide or a hydrated oxide of silica having a primary particle diameter of 1 to 100 nm.

18. The composition of claim 6 wherein said inorganic particles comprise an oxide or a hydrated oxide of silica having a primary particle diameter of 1 to 100 nm.

19. A molding or coating prepared from the composition of claim 1.

* * * * *